United States Patent
Seki

[19]

[11] Patent Number: 6,152,659

[45] Date of Patent: *Nov. 28, 2000

[54] ROTARY DRIVING DEVICE FOR PRESS MACHINE

[75] Inventor: Masayuki Seki, Odawara, Japan

[73] Assignee: Amada Metrecs Company, Limited, Kanagawa, Japan

[*] Notice: Under 35 U.S.C. 154(b), the term of this patent shall be extended for 1042 days.

[21] Appl. No.: 08/710,551

[22] Filed: Sep. 19, 1996

Related U.S. Application Data

[63] Continuation of application No. 08/262,901, Jun. 21, 1994, abandoned.

[30] Foreign Application Priority Data

Feb. 2, 1994 [JP] Japan ...................................... 6-10849

[51] Int. Cl.$^7$ .................................................. B23B 47/02
[52] U.S. Cl. ............................................................. 408/137
[58] Field of Search .................................. 408/137, 138; 470/198

[56] References Cited

U.S. PATENT DOCUMENTS

| | | | |
|---|---|---|---|
| 3,767,313 | 10/1973 | Bohoroquez et al. | 408/137 |
| 5,012,709 | 5/1991 | Su . | |

FOREIGN PATENT DOCUMENTS

| | | |
|---|---|---|
| 212006 | 3/1987 | European Pat. Off. . |
| 305762 | 3/1989 | European Pat. Off. . |
| 394925 | 10/1990 | European Pat. Off. . |
| 3322566 | 1/1985 | Germany . |
| 4-51323 | 2/1992 | Japan . |
| 4-115816 | 4/1992 | Japan . |
| 4-115817 | 4/1992 | Japan . |
| 93/13900 | 7/1993 | WIPO . |

OTHER PUBLICATIONS

European Search Report—EP 94 10 8482 15—Search Completed May 1995.

*Primary Examiner*—Lowell A. Larson
*Attorney, Agent, or Firm*—Blank Rome Comisky & McCauley LLP

[57] ABSTRACT

A rotary driving device for a press machine includes: a main body (11); a push head member (21) provided for the main body (11) reciprocatingly movably in an axial direction thereof and driven in the axial direction by a striker (S) of the press machine; an air-tight gaseous spring unit (15) mounted inside the main body (11), for generating a return elastic force to urge the push head member (21) in a direction opposite to a strike direction of the striker (S); a male thread axle member (29) in mesh with female threads (33) formed in the main body (11) and rotatable when moved in an axial direction thereof by the push head member (21); a lead nut (47) exchangeably and fixedly mounted on the main body (11); a lead thread member (51) in mesh with the lead nut (47) and rotatably supported by the main body (11), for holding a rotary driven tool (T); and a coupling section (43, 55) for coupling the male thread axle member (29) and the lead thread member (51) in torque transmission relationship and in relative axial displacement relationship with respect to each other so as to absorb a difference in axial speed between both the members (29, 51). Since at least one air-tight gaseous spring unit (15) is mounted inside the main body, it is possible to prevent the gas leakage without maintenance and thereby to realize an unmanned press machine without replenishment of the gas for many hours.

6 Claims, 6 Drawing Sheets

ROTARY DRIVING DEVICE FOR PRESS MACHINE

This is a continuation of application Ser. No. 08/262,901 filed Jun. 21, 1994, now abandoned.

BACKGROUND OF THE INVENTION

1. Field of the Invention

The present invention relates to a rotary driving device for a press machine driven by a striker of the press machine, and more specifically a rotary driving device suitable for use with a turret punch press being mounted on a die mounting station thereof.

2. Description of the Related Art

Examples of the rotary driving device for a press machine (which is usable being mounted on a die mounting station of a turret punch press, for instance) are already disclosed in Japanese Published Unexamined (Kokai) Patent Application Nos. 4-51323, 4-115816, 4-115817, etc. Each of these rotary driving devices comprises: a cylindrical main body fitted to a die mounting hole formed in a die mounting station; a push head member provided for the main body reciprocatingly movably in an axial direction thereof and driven in the axial direction by a striker of the press machine; a male thread axle member in mesh with female threads formed in the main body and rotatable when moved in an axial direction thereof by the push head member; a lead thread member in mesh with a lead nut and rotatably supported by the main body, for holding a rotary driven tool; and a coupling section for coupling the male thread axle member and the lead thread member in torque transmission relationship and relative axial displacement relationship with respect to each other so as to absorb a difference in axial speed between both the members.

In the above-mentioned prior art rotary driving device for a press machine, since a strong impact force is generated the instant that a rotary driven tool is brought into pressure contact with work; that is, the instant that the linear motion is switched to a rotary motion, there exists a problem in that the work is inevitably damaged by the energy or the pressure thereof, so that pressure traces are formed on the work.

Further, the above-mentioned impact force is transmitted to a rotary thread (a ball screw or a roller screw) and a nut, there exists another problem in that this shock exerts a bad influence upon these screw and nut.

FIGS. 1A to 1C show the relationship between the sliding resistance of a rotary thread, in which FIG. 1A shows that obtained when a rotary thread of 4 mm stroke per revolution is used; FIG. 1B shows that obtained when a rotary thread of 3 mm stroke per revolution is used; and FIG. 1C shows that obtained when a rotary thread of 2 mm stroke per revolution is used. In these drawings, E denotes a point when the rotary driven tool is brought into pressure contact with the work; F denotes the bottom dead center of the press; G denotes an impact force; and H denotes a rotary resistance, respectively. As shown in FIGS. 1A to 1C, since the impact force increases beyond an allowable range in the case of the rotary threads of 3 and 2 mm stroke per revolution, at least the rotary thread of 4 mm stroke per revolution so far must be used. Further, when the velocity of linear motion increases, the impact force also increases in proportion thereto.

On the other hand, in the press machine, a return spring is necessary to return the push head member in a direction opposite to the striking direction of the striker. In the prior art rotary driving device, this return spring is of gaseous spring type such that a piston member is slidably fitted into a cylinder boredirectly formed in the main body by cutting processing and further a gaseous spring chamber is filed with a compressive fluid (e.g., nitrogen gas) supplied from a separate gas tank.

In the prior art gas spring as described above, since the cylinder bore is directly formed in the main body of the rotary drive device, there exists a problem in that it is difficult to secure the air tightness of the gaseous spring chamber, so that the gas in the spring chamber inevitably leaks. Here, once the gas in the gaseous spring chamber leaks, since the spring force of the gaseous spring is lowered, it has been necessary to often replenish the gaseous spring chamber with gas to maintain a required gas pressure, thus resulting in a problem in that it is impossible to realize an unmanned press machine operated for many hours at night, for instance.

In addition, since the separate gas tank must be fitted into a die mounting hole different from the main body of the rotary driving device, the rotary driving device occupies two die mounting stations in total in the case of a die mounting station of "1 (¼)" size, for instance. As a result, the prior art rotary driving device can be used only with the turret punch press provided with a multi-track (e.g., 3 tracks) die mounting station, thus causing a limitation in use of the rotary driving device with the press machine.

SUMMARY OF THE INVENTION

With these problems in mind, therefore, it is the object of the present invention to provide a rotary driving device for a press machine, which can reduce the impact force generated when the rotary driven tool is brought into pressure contact with work to decrease impact traces on the surface of the work.

Further, the other object of the present invention is to provide a rotary driving device for a press machine, which can retain the gas pressure in the gaseous spring chamber for many hours without maintenance, which dose not occupy a plurality of additional die mounting stations, and which dose not limit the press machine to be used therewith.

To achieve the above-mentioned object, the first aspect of the present invention provides a rotary driving device for a press machine, comprising: a main body composed of an upper member and a lower member; a push head member provided for the upper member of said main body reciprocatingly movably in an axial direction thereof and driven in the axial direction by a striker of the press machine; urging means mounted inside the upper member of said main body, for generating a return elastic force to urge said push head member in a direction opposite to a strike direction of the striker; a male thread axle member in mesh with female threads formed in the upper member of said main body and rotatable when moved in an axial direction thereof by said push head member; a lead nut exchangeably and fixedly mounted on the lower member of said main body; a lead thread member in mesh with said lead nut and rotatably supported by said main body, for holding a rotary driven tool; coupling means for coupling said male thread axle member and said lead thread member in torque transmission relationship and in relative axial displacement relationship with respect to each other so as to absorb a difference in axial speed between said male thread axle member and said lead thread member; and impact absorbing means interposed between a lower surface of the female threads formed in the upper member of said main body and an upper surface of the lower member of said main body.

Further, it is preferable that the impact absorbing means is a disk spring and the urging means (41) is at least one airtight gaseous spring unit (15).

In the rotary driving device according to the present invention, since the impact force generated the instant that the rotary driving device is brought into pressure contact with the work can be reduced by the shock absorbing member, it is possible to reduce pressure traces formed in the work.

Further, to achieve the other object, the second aspect of the present invention provides a rotary driving device for a press machine, comprising: a main body; a push head member provided for said main body reciprocatingly movably in an axial direction thereof and driven in the axial direction by a striker of the press machine; an air-tight gaseous spring unit mounted inside said main body, for generating a return elastic force to urge said push head member in a direction opposite to a strike direction of the striker; a male thread axle member in mesh with female threads formed in said main body and rotatable when moved in an axial direction thereof by said push head member; a lead nut exchangeably and fixedly mounted on said main body; a lead thread member in mesh with said lead nut and rotatably supported by said main body, for holding a rotary driven tool; and coupling means for coupling said male thread axle member and said lead thread member in torque transmission relationship and relative axial displacement relationship with respect to each other so as to absorb a difference in axial speed between said male thread axle member and said lead thread member.

In the rotary driving device according to the present invention, when the push head member is struck by a striker of a press machine in the axial direction thereof, the male thread axle member is moved in the axial direction thereof against the return elastic force of the gaseous spring unit. In this case, since the male thread member is in mesh with a female threads, the male thread member is rotated. The rotational force is transmitted to the lead thread member via the coupling means for coupling the male thread axle member and the lead thread member so as to absorb a difference in axial speed between the two members, so that the rotary driving device tool is driven axially and further rotated in accordance a thread pitch of the lead thread member.

In the rotary driving device according to the present invention, since the air-tight gaseous spring units are provided inside the main body so as to generate a return elastic force, respectively to urge the push head member in a direction opposite to the strike direction of the striker, it is possible to prevent the gas leakage from the gaseous spring chamber.

BRIEF DESCRIPTION OF THE DRAWINGS

FIG. 7 is a graphical representations showing the relationship between the time elapsed and the sliding resistance of male thread members used for the rotary driving device for a press machine according to the present invention.

DETAILED DESCRIPTION OF THE EMBODIMENTS

Figure 1A:
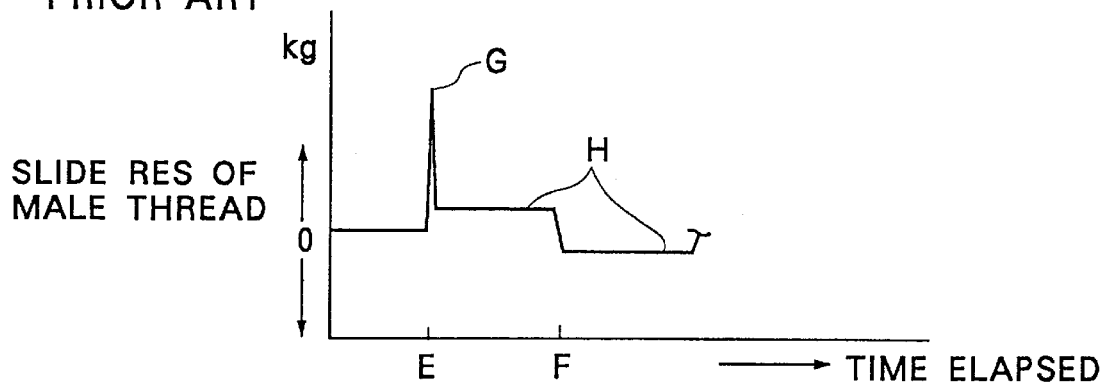
FIGS. 1A to 1C are graphical representations showing the relationship between the time elapsed and the sliding resistance of male thread members used for the prior art rotary driving device for a press machine.
Figure 1B:
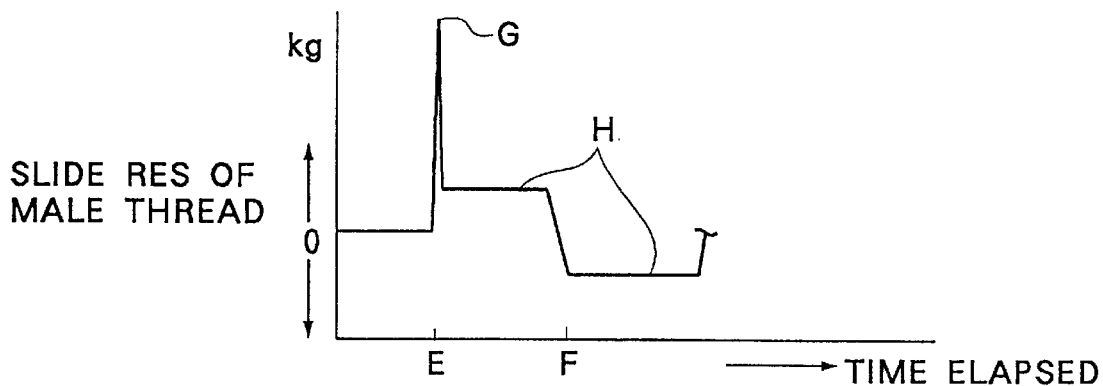
Figure 1C:
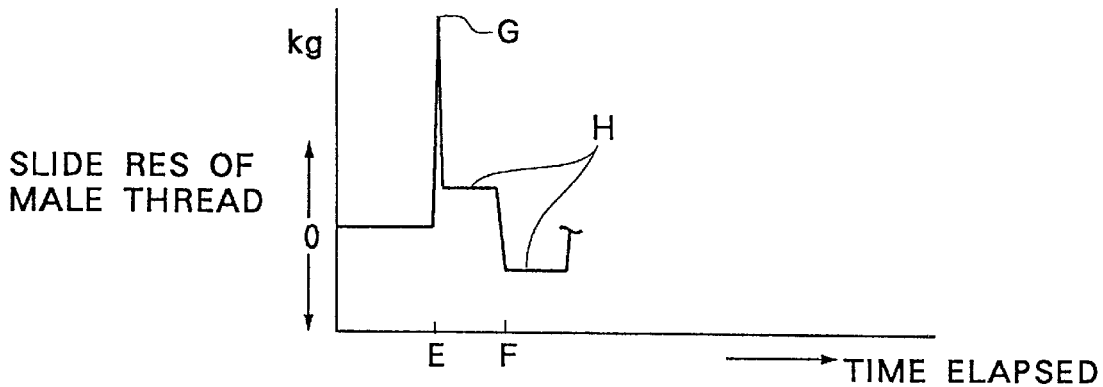
Figure 2:
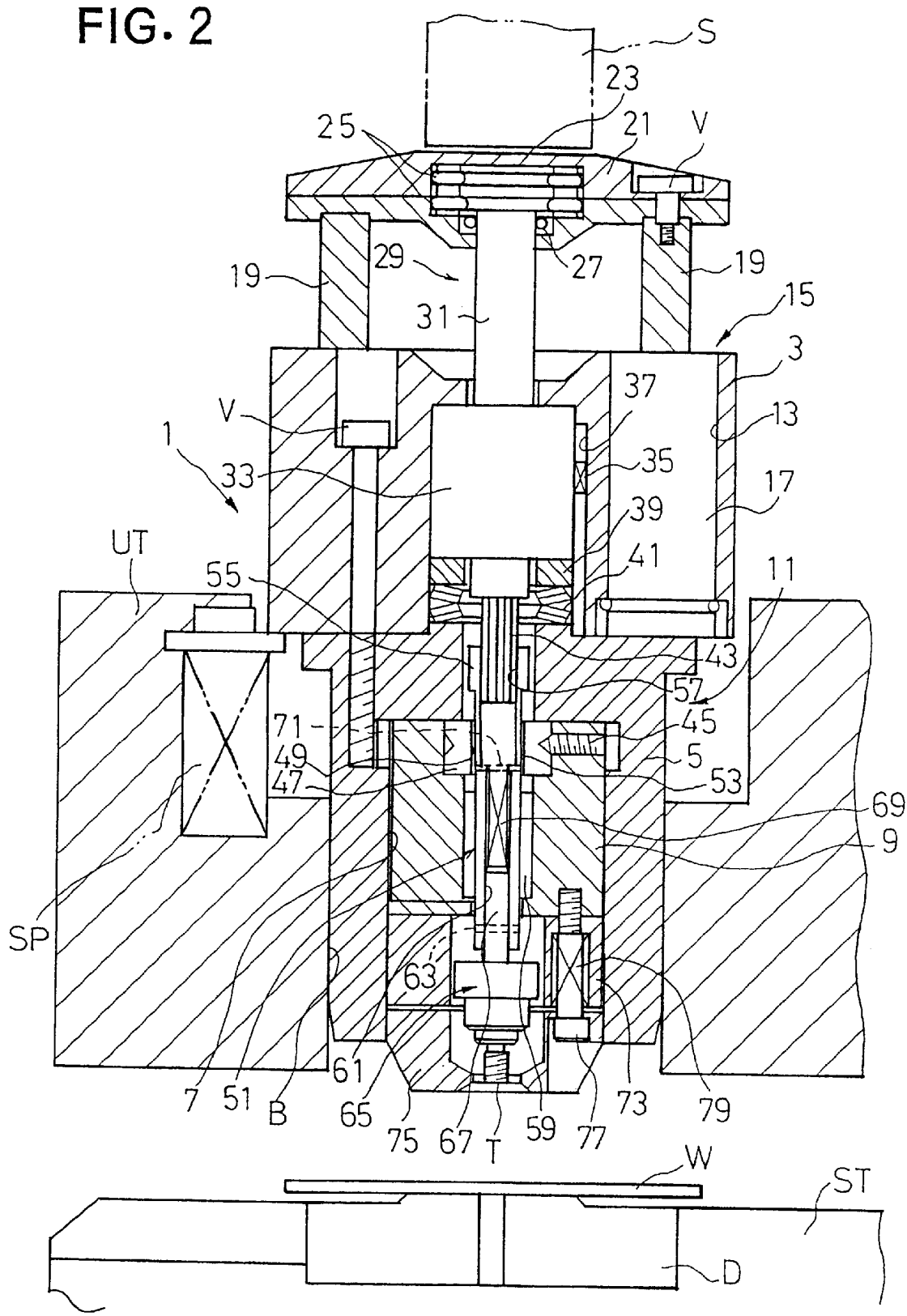
FIG. 2 is a cross-sectional view showing an embodiment of the rotary driving device for a press machine according to the present invention.

An embodiment of the present invention will be described hereinbelow with reference the attached drawings. FIG. 2 shows the state where the rotary driving device for a press machine according to the present invention is positioned to the top dead center of the press machine.

In FIG. 2, the rotary driving device 1 for a press machine has a cylindrical main body 11, which is composed of a lower member 5, an upper member 3 fixed to the lower member 5 with a plurality of bolts V, and a lead nut support main body 9 removably fitted to a mount hole 7 of the lower member 5. The cylindrical main body 11 is inserted into a die mounting hole B formed in an upper turret disk UT of a turret punch press, in such a way as to be floated slightly upward by a plurality of compressive springs SP. In this embodiment, the die mounting hole B (into which the cylindrical main body 11 is fitted) is "2" in the die mounting station size, for instance.

In the upper member 3, a plurality of gaseous spring unit mounting holes 13 are formed around the central axis of the upper member 3 at regular angular intervals. Further, an outer casing 17 of an air-tight gaseous spring unit 15 (urging means) is fitted to each of these gaseous spring unit mounting holes 13. This air-tight gaseous spring unit 15 has a piston rod 19 extending upward and fixed to a push head member 21 with a bolt V (the uppermost volt) at the upper end thereof, and serves as a return spring for urging the striker S (striking means) for striking the push head member 21 in the direction opposite to the strike direction of the striker S.

The push head member 21 is formed with an upper surface 23 facing the striker S (striking means) of the press machine, and movable reciprocatingly in the axial direction of the cylindrical main body 11 (i.e., up and down in FIG. 2) by the piston rods 19.

By this push head member 21, an upper end portion of a male thread axle member 29 (e.g., ball thread axle or roller thread axle) is supported via a thrust bearing 25 and a radial bearing 27 so as to be rotatable around its central axis thereof. The male thread axle member 29 is formed with male threads 31 in mesh with female threads formed in a female thread member 33 mounted on the upper member 3. The lead of both the male thread member 31 and the female thread member 33 is determined to be relatively large so as to be rotated smoothly in the axial direction thereof when moved vertically.

The female thread member 33 is formed with a key 35 in the outer circumferential surface thereof. This key 35 is engaged with a key groove 37 formed in the inner circumferential surface of the upper member 3. Further, a metallic spacer 39 and an impact absorbing member 41 (e.g., a disk spring, an urethane spring, etc.) are interposed between the lower surface of the female thread member 33 and the upper surface of the lower member 5. As this impact absorbing member 41, the disk spring is most preferable from the standpoint of shock reduction.

The male thread member 29 extends through the female thread member 33 axially in the vertical direction thereof. The male thread member 29 is formed with a spline axle portion 43 at the lower end portion thereof located within the lower member 5. A lead nut 47 is fixed to a lead nut support main body 9 with a set screw 45. This lead nut 47 is formed with a thread hole 49 along the same axial line as that of the male thread member 29 so as to be in mesh with a male thread portion 53 of a lead thread member 51. The lead of the thread hole 49 of the lead nut 47 and the male thread portion 53 of the lead thread member 51 is determined to be the same value as the lead of a tap T (described later).

This lead thread member 51 extends through the lead nut 47 in the vertical direction. A spline member 55 is fixed to the upper end portion of this lead thread member 51. The spline member 55 is formed with a spline hole 57, into which the spline axle portion 43 of the male thread axle member 29 is spline-coupled movably in the axial direction thereof.

The lead thread member 51 is supported by the lead nut support main body 9 via a bush 59 so as to be rotatable and further slidably movable in the axial direction thereof. Further, a support axle 67 of a tool chuck 65 is fitted into a hollow axle portion 61 of the lead thread member 51 and further fixed thereto with a pin 63 so as to be movable by a predetermined distance in the axial direction thereof. Further, a compressive coil spring 69 is provided within the hollow axle portion 61 and between a stopper pin 71 mounted to the lead thread member 51 and the support axle 67 of the tool chuck 65 in order to urge the tool chuck 65 in the downward direction. A tap T (tapping tool) can be held by the tool chuck 65 so as to be exchanged.

At the lower end portion of the lead nut support main body 9, a chuck protection ring member 73 and a plate push cap 75 are attached with a plurality of bolts 77. This chuck protection ring member 73 is fixed to the lower end portion of the lead nut support main body 9 with the bolts 77. On the other hand, the plate push cap 75 is urged by another compressive spring 79 in the downward direction. Therefore, this plate push cap 75 is movable relative to the chuck protection ring member 73 by a predetermined axial distance against an elastic force of the compressive coil spring 79.

Here, the plate push cap 75 is used as a piston actuator of a cutting lubricant supplying pump (not shown) mounted on the cylindrical main body 11. When this plate push cap 75 is moved toward the chuck protection ring member 73 in the axial direction thereof, the cutting lubricant in the cutting lubricant tank (described later) is Jetted out toward the tap T through a cutting lubricant passage.

A lower turret ST is provided under the upper turret UT. In this lower turret ST, a die D is mounted and work W to be tapped is mounted on this die D.

Figure 3:
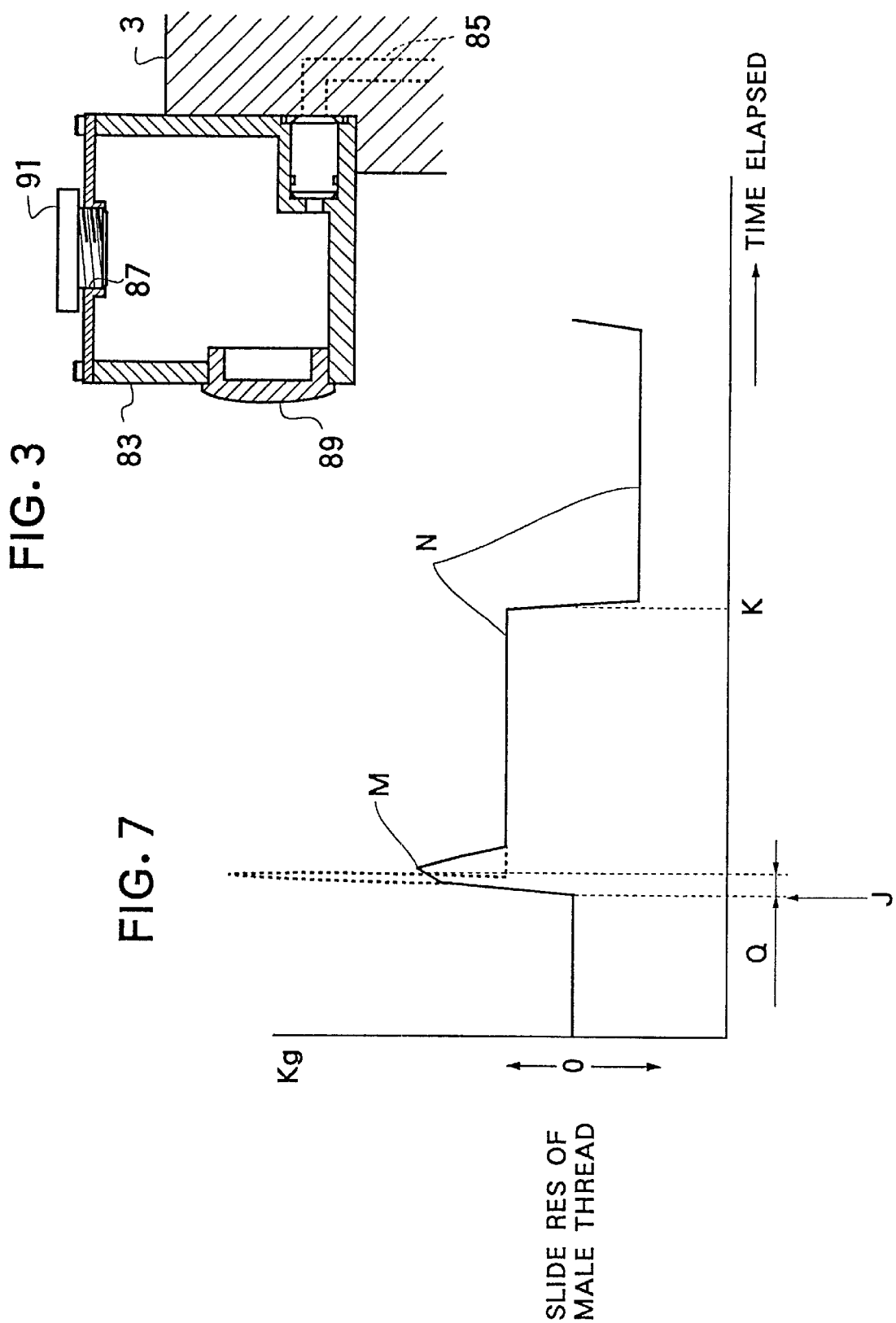
FIG. 3 is a cross-sectional view showing a cutting lubricant tank disposed on an upper member of the rotary driving device for a press machine according to the present invention shown in FIG. 2.

FIG. 3 shows the cutting lubricant tank 83, which is fixedly mounted on the side portion (in a common unoccupied space of the press machine) of the upper member 3, in such a way as not to be obstructive when another die is mounted on the upper turret disk UT. The cutting lubricant tank 83 is provided with a cutting lubricant inlet port 87 and a level gauge 89. The cutting lubricant inlet port 87 is closed by a cap 91. The cutting lubricant is supplied to the tap T through the cutting lubricant passage 85.

The operation of the rotary driving device for a press machine according to the present invention will be described hereinbelow. FIG. 2 shows the initial stage where the striker S is located at the uppermost position. When the striker S is lowered from this position, the striker S is brought into pressure contact with the upper surface 23 of the push head member 21 to push the push head member 21 in the axially downward direction thereof.

Figure 4:
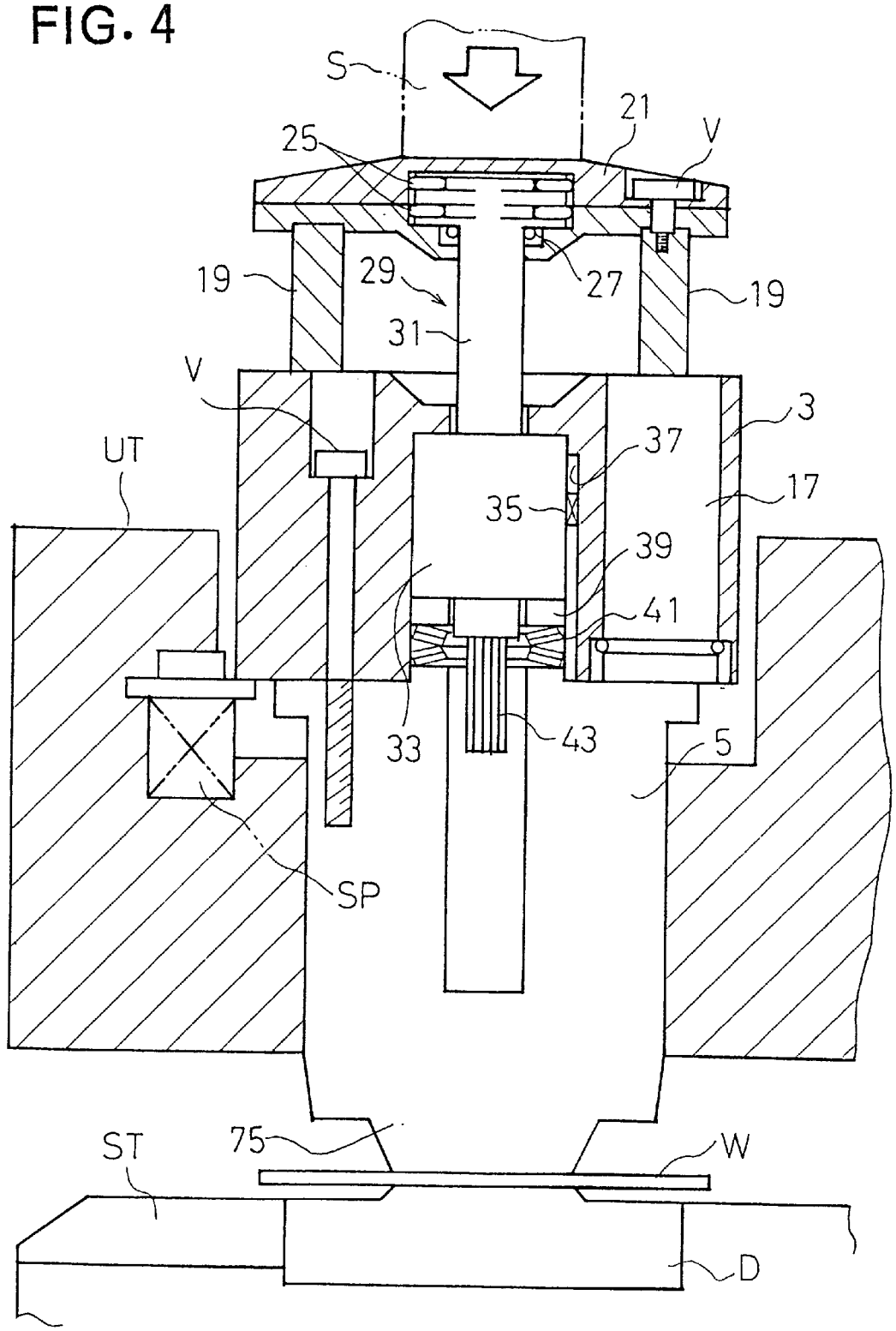
FIG. 4 is a cross-sectional view showing the state where a press tool is being lowered in the rotary driving device for a press machine shown in FIG. 2.

Then, the entire cylindrical main body 11 is lowered toward the upper turret disk UT against the elastic force of the compressive coil springs SP. Therefore, as shown in FIG. 4, the plate push cap 75 is brought into pressure contact with the upper surface of the work W mounted on the lower turret disk ST to push the work W. When the push head member 21 is further pushed downward, the compressive coil springs 79 are then deformed, so that the cylindrical main body 11 is further lowered relative to the plate push cap 75. Accordingly, the chuck protection ring member 73 is brought into pressure contact with the plate push cap 75 for pumping action, so that the cutting lubricant within the cutting lubricant tank 83 is Jetted toward the tap T.

Figure 5:
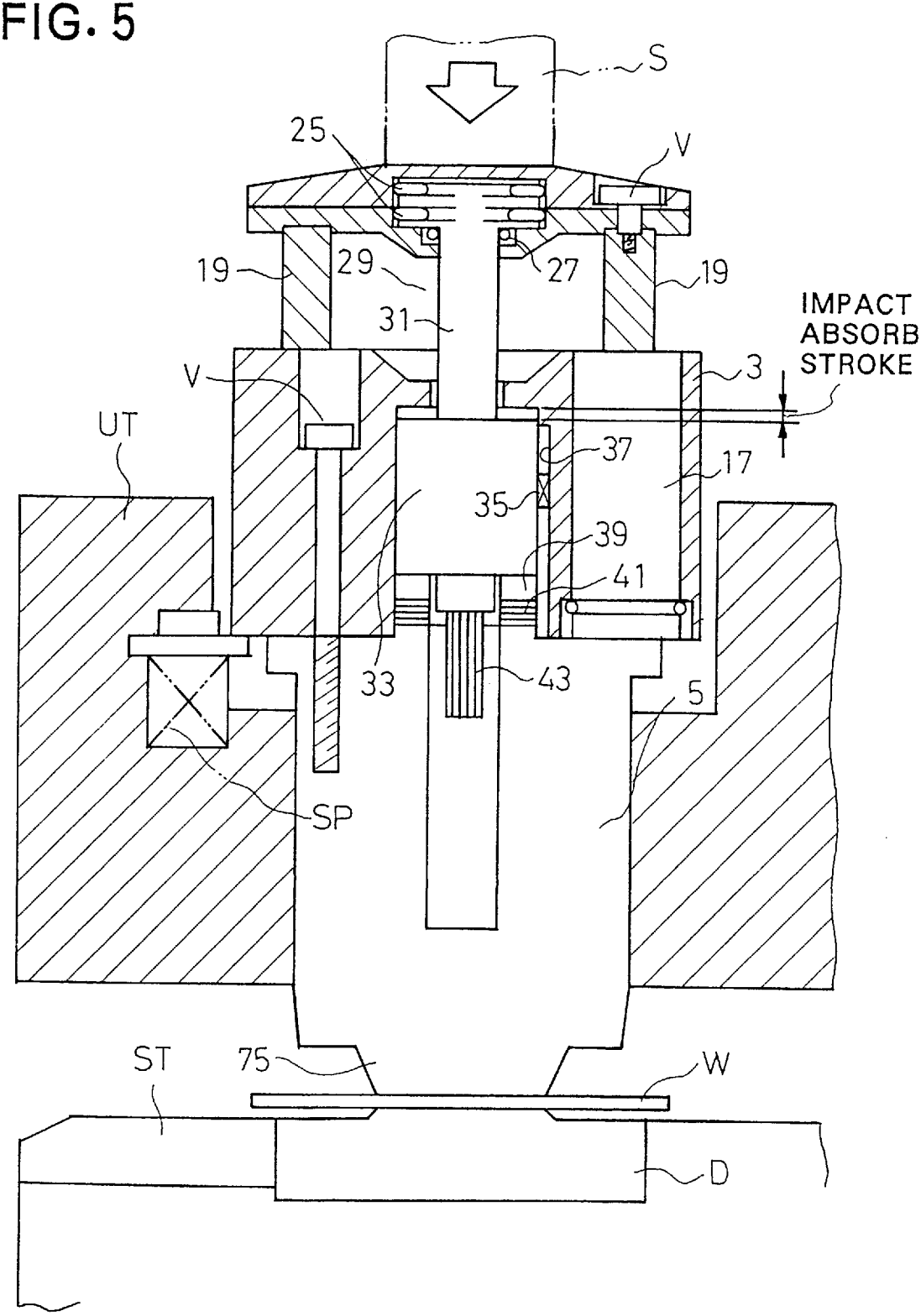
FIG. 5 is a cross-sectional view showing the state where an impact force is being absorbed in the rotary driving device for a press machine shown in FIG. 2.

When the push head member 21 is further lowered, the push ead member 21 is further lowered relative to the cylindrical ain body 11 against the elastic force of the gaseous spring units 15. In accompany with the downward motion of the push head member 21, the male thread axle member 29 is moved downward in the axial direction thereof. Consequently, the male thread axle member 29 is lowered being rotated, as shown in FIG. 5, at a rate determined by the thread lead due to mesh between the male thread axle member 29 and the female thread member 33. The thread lead is about 3 mm, for instance. In this case, the male thread axle member 29 is lowered by an axial stroke of 3 mm per revolution thereof. When the thread lead is about 3 mm, it is possible to increase the feed clear distance (material feeding space) between the plate push cap 75 and the die D mounted on the lower turret disk ST twice or more larger than that of the case where the thread lead is about 4 mm, that is, from about 5 mm to about 11 mm, for instance.

Here, when the male thread axle member 29 is rotated, since this rotation is transmitted to the spline member 55 through the spline axle portion 43, the lead thread member 51 rotates. Here, since the lead thread member 51 is in mesh with the lead nut 47, the lead thread member 51 is moved downward in the axial direction being rotated at a rate determined by the thread lead, so that the tap T attached to the tool chuck 65 is lowered being rotated to form a female thread in the work W.

As described above, after the tap T has been brought into pressure contact with the work W and when the tap T is being rotated for tapping processing, as shown in FIG. 5, since the impact can be absorbed by the disk spring 41, it is possible to reduce the impact force and thereby to eliminate to pressure traces (caused by the pressure contact of the plate push cap 75).

In the above-mentioned thread cutting process, the male thread axle member 29 is lowered in the axial direction at a rate determined by the thread lead of the male thread member 31. On the other hand, the lead thread member 51 is lowered at a rate determined by the thread lead of the lead male thread portion 53, that is, at a rate determined by the thread lead the same as that of the tap T. Here, since the thread lead of the male thread portion 31 is determined to be larger than that of the lead male thread portion 53, the male thread axle member 29 is rotated at a speed the same as that of the lead thread member 51 in the same rotative direction but lowered at a speed higher than that of the lead thread member 51 in the axial direction, so that there exists a difference in the axial stroke between the male thread axle member 29 and the lead thread member 51. However, since the male thread axle member 29 and the lead thread member 51 are coupled to each other by splines (formed between the spline axle portion 43 and the spline hole 57 formed in the spline member 55) so as to be mutually movable in the axial direction thereof, both the members 29 and 51 are rotated being slid relative to each other at the spline coupled portion in the axial direction thereof, with the result that it is possible to rotate and further move both the members 29 and 51 in the axial direction relative to each other without any trouble. In summary, the spline axle portion 43 and the spline member 55 can couple both the male thread axle member 29 and the lead thread member 51 in torque transmission relationship and further in relative axial displacement relationship with respect to each other in such a way that a difference in axial speed between both the members 29 and 51 can be absorbed.

Figure 6:
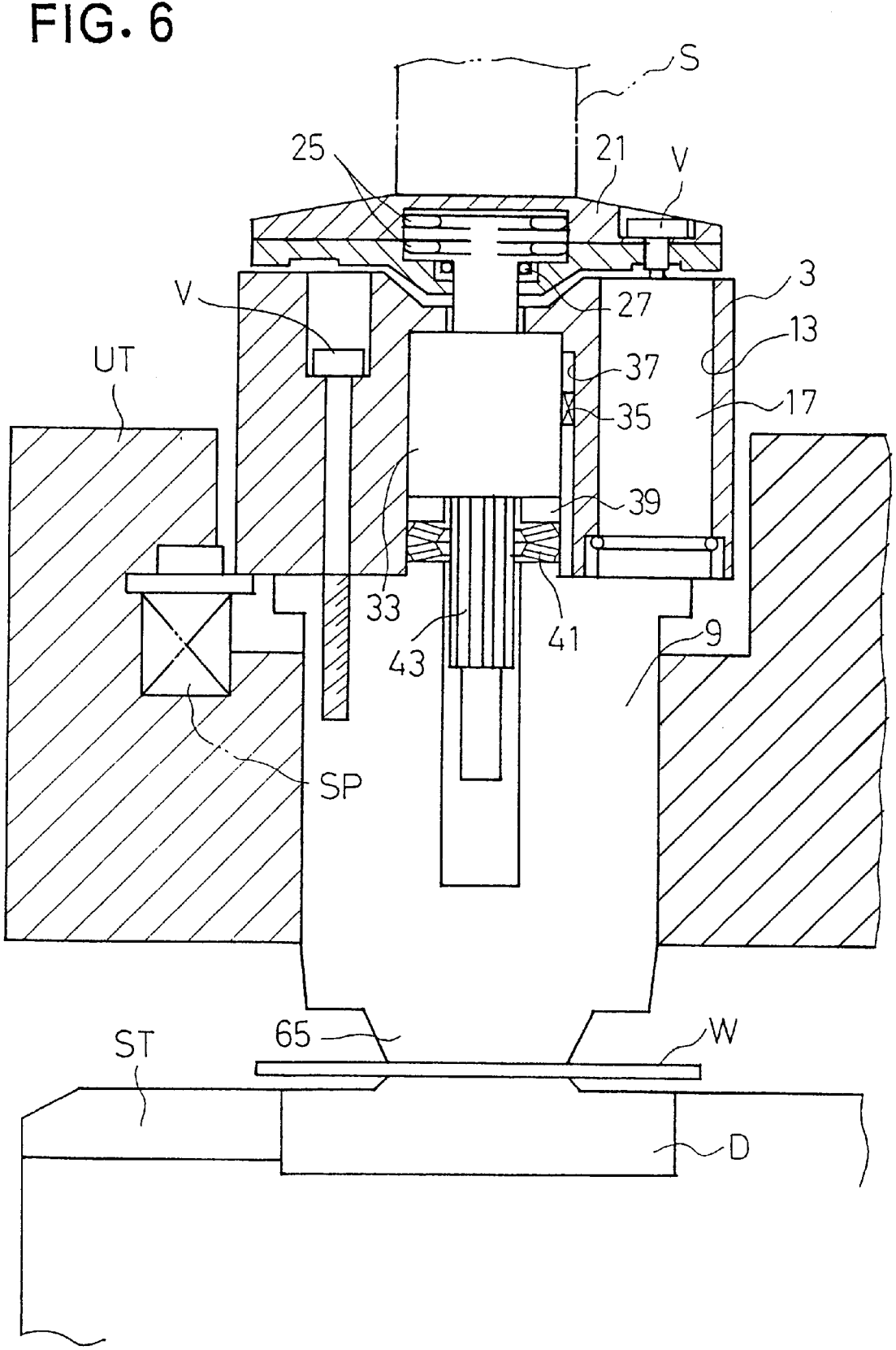
FIG. 6 is a cross-sectional view showing the state where a press tool reaches a bottom dead center in the rotary driving device for a press machine shown in FIG. 2.

As shown in FIG. 6, when the striker S reaches the lowermost position, the taping processing ends. Thereafter, when the striker S rises, the push head member 21 is moved upward relative to the cylindrical main body 11 by the elastic force of the gaseous spring units 15. Therefore, the male thread axle member 29 is rotated in the reverse direction, and thereby all the spline member 55 and the lead thread member 51 are rotated in the reverse direction, so that the male thread axle member 29 and the lead thread member 51 are both raised upward to the original upward positions according to the respective leads.

FIG. 7 shows the relationship between the sliding resistance generated when the male thread axle member 29 is rotated and the time elapsed, in which the symbol J denotes a time point when the cylindrical main body 11 is brought into pressure contact with the work W; K denotes the bottom dead center of the press machine; M denotes the impact value; N denotes the rotative resistance; and Q denotes the stroke of the impact absorbing member. As understood by this graphical representation, since the impact absorbing member 41 is interposed between the lower surface of the female thread member 33 and the upper surface of the lower member 5, it is possible to reduce the impact resistance owing to the action of the impact absorbing member 41 down to about a half of that generated when no impact absorbing member is interposed as indicated by a dotted line. That is, since the impact force can be reduced, it is possible to reduce the impact or pressure traces formed on the plate material W to be tapped.

Further, without being limited to only the embodiment as described above, it is possible to modify the embodiment in various ways without departing the spirit and scope thereof.

As described above, in the rotary driving device for a press machine according to the present invention, since the impact force generated when the rotary driving device is brought into pressure contact with the work can be reduced, it is possible to prevent the work material from being damaged by the device; that is, to reduce pressure traces formed on the surface of the work.

In addition, the gaseous spring units (urging means) for returning the push head member in the direction opposite to the strike direction of the striker of the press machine are of airtight gaseous spring unit type mounted within the rotary driving device itself, it is possible to provide a rotary driving device for a press machine, which can prevent the gas leakage and thereby retain the gas pressure in the gaseous spring chamber without replenishment and maintenance of the gas, so that it is possible to realize an unmanned operation of the rotary driving device for a long time at night, for instance. Further, since the gaseous spring units are mounted within the main body of the rotary driving device without need of any separate gas tanks, a plurality of die mounting stations are not occupied when the rotary driving device is mounted on the turret disk, so that it is possible to use the rotary driving device for any press machines without any limitation.

What is claimed is:

1. A rotary driving device for a press machine, which is supported by a supporting member and driven by a striker for rotating and extending a tool into a workpiece, the rotary driving device comprising:

a main body including an upper member and a lower member, the main body being supported movably in an axial direction thereof by the supporting member;

a push head member provided on the upper member of the main body, the push head member being movable in the axial direction of the striker;

urging means mounted inside the upper member of the main body, for generating a return elastic force to urge the push head member in a direction opposite a striking direction of the striker;

a male thread axle member supported rotatably by the push head member, the male thread axle member having a male thread;

a female thread supported by the upper member of the main body, the female thread being movable in an axial direction and immovable in a circumferential direction relative to the upper member, and the female thread being in mesh with the male thread;

a lead nut exchangeably and fixedly mounted on the lower member of the main body;

a lead thread member in mesh with the lead nut and rotatably supported by the main body, for holding a rotary driven tool;

coupling means for coupling the male thread axle member and the lead thread member in torque transmission relationship and in relative axial displacement relationship with respect to each other so as to absorb a difference in axial speeds between the male thread axle member and the lead thread member; and first impact absorbing means interposed between a lower surface of the female thread and an upper surface of the lower member.

2. A rotary driving device for a press machine of claim 1, further comprising a second impact absorbing means interposed between the lead thread member and the rotary driven tool for absorbing impacts exerted on the rotary driven tool.

3. A rotary driving device for a press machine of claim 2, further comprising: a plate pusher provided under the lower member and a third impact absorbing means interposed between the lower member and the plate pusher for absorbing the impact exerted on the plate pusher.

4. A rotary driving device for a press machine of claim 1, wherein the urging means is an air-tight gaseous spring.

5. A rotary driving device for a press machine of claim 2, wherein the second impact absorbing means is a coil spring.

6. A rotary driving device for a press machine of claim 3, wherein the third impact absorbing means is a coil spring.

* * * * *